L. A. BECKER.
RECEPTACLE FOR DISPENSING CRUSHED FRUIT, SYRUPS, OR THE LIKE.
APPLICATION FILED OCT. 12, 1908.

952,409.

Patented Mar. 15, 1910.

Witnesses:
J. M. Daggett.
Nathaniel Gerlach

Inventor
Louis A. Becker
by Pierce & Fisher
Attys.

UNITED STATES PATENT OFFICE.

LOUIS A. BECKER, OF CHICAGO, ILLINOIS, ASSIGNOR TO L. A. BECKER COMPANY, OF CHICAGO, ILLINOIS, A CORPORATION OF NEW JERSEY.

RECEPTACLE FOR DISPENSING CRUSHED FRUIT, SYRUPS, OR THE LIKE.

952,409.     Specification of Letters Patent.     Patented Mar. 15, 1910.

Application filed October 12, 1908. Serial No. 457,276.

*To all whom it may concern:*

Be it known that I, LOUIS A. BECKER, a resident of Chicago, county of Cook, and State of Illinois, have invented certain new and useful Improvements in Receptacles for Dispensing Crushed Fruit, Syrups, or the Like, of which I do declare the following to be a full, clear, and exact description, reference being had to the accompanying drawing, forming part of this specification.

My present invention has relation to the improvement of that class of receptacles for crushed fruit, syrups and the like commonly employed in connection with soda water fountains, the object of the invention being primarily to provide a receptacle that shall present a more attractive appearance, and which may display to the intending purchaser the character of the fruit from which the contents of the receptacle are made.

With this end in view my invention consists primarily in providing the receptacle with a transparent cover adapted to contain, preferably, specimens of the natural fruit from which the contents of the receptacle are made.

The invention also consists in the details of construction hereinafter described, illustrated in the accompanying drawing, and more particularly pointed out in the claims at the end of this specification.

Figure 1:
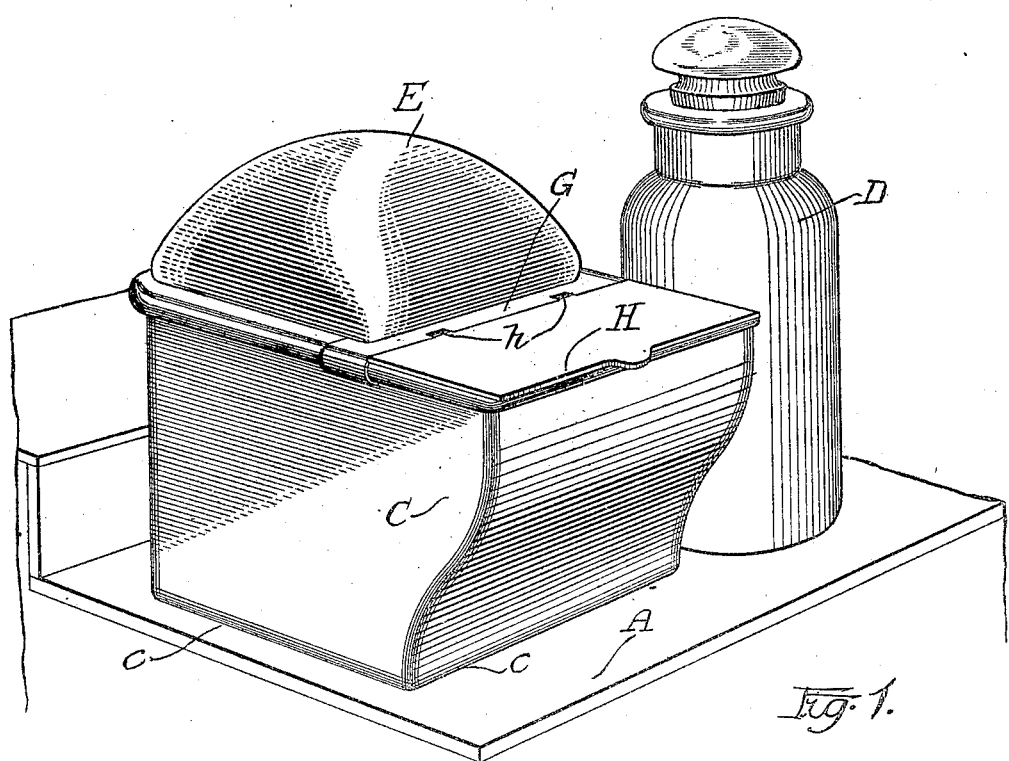
Figure 2:
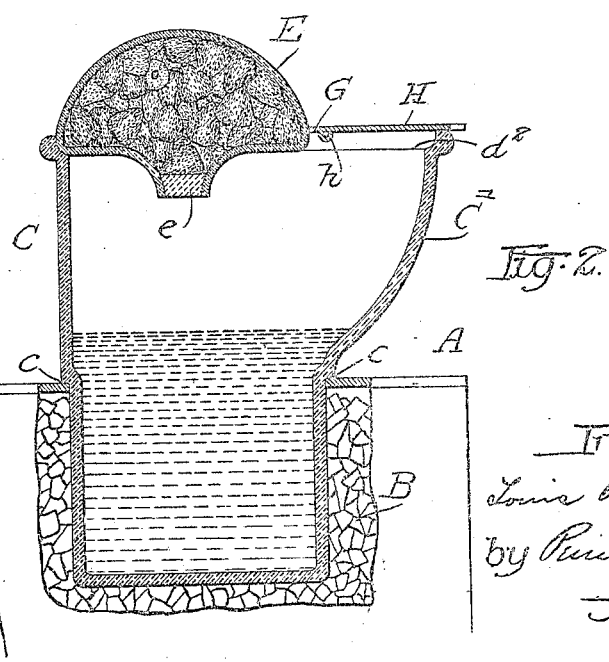

Figure 1 is a perspective view showing a portion of a soda water fountain having my improved receptacle mounted thereon. Fig. 2 is a view in central vertical section through my improved receptacle and the associate parts shown in Fig. 1.

A designates the counter of a soda water fountain beneath which provision is ordinarily made for containing crushed ice B. The counter A is ordinarily formed with a series of openings adapted to receive receptacles of different kinds. In Fig. 1 the counter A is shown as having openings to receive my improved receptacle C, and a bottle D such as is now commonly used at soda water fountains for containing special syrups or the like.

My improved receptacle C is preferably made of glass and upon the exterior of this receptacle is preferably formed an offset portion $c$, which enables the receptacle to rest in its appropriate opening formed in the counter A. The receptacle C is formed with an open top upon the inside of which is preferably formed a shoulder $d^2$ whereon the cover E of the receptacle may rest. The cover E is hollow and is formed of glass and of such outline that it may be conveniently sustained by the receptacle C. The opening of the hollow transparent cover E is preferably formed in its under side, this opening being closed by a stopple $e$ after the cover E has been filled with whole fruit or the like, which the cover is designed to display.

As shown, there is extended across the top of the receptacle C a metal strip G, the edges of which are turned down slightly around the expanded top of the receptacle C so as to securely hold the strip or plate G in position. To this strip or plate G is hinged, as at $h$, a lid or cover H which will be raised when access to the contents of the receptacle C is desired.

Preferably, the front portion of the receptacle C has an expanded part C' to permit the contents in the lower part of the receptacle to be readily reached by the usual long handle spoons when the lid or cover H has been raised.

From the foregoing description it will be seen that when the receptacle C is in position for use it will be held against displacement by the shoulder $c$, and the lower portion of the receptacle will be exposed to the chilling action of the ice beneath the counter. When access is desired to the contents of the receptacle the lid or cover H will be raised for such purpose. The hollow cover E serves to expose to the view of the intending purchaser in most attractive manner, natural fruit such as strawberries, grapes or the like and to indicate the character of the contents of the receptacle C. Inasmuch as the hollow cover E may be tightly sealed the natural fruit, or whatever is contained within the cover, may be preserved against deterioration for a long period.

It is manifest that the precise details of the above construction may be varied without departure from the scope of the invention.

Having thus described my invention what

I claim as new and desire to secure by Letters Patent, is:—

1. A receptacle of the character described having an open top, a metal strip extending across said top leaving openings at each side thereof, the ends of said strip being arranged to interlock with the upper edge of the receptacle, a lid or cover hinged to said strip at one side and a freely removable, transparent cover loosely fitted within the opening at the other side of said strip.

2. A receptacle of the character described having a metal strip extending across the top and provided with turn-down edges engaging the upper part of said receptacle, a lid or cover H hinged to said strip at one side and adapted to close the open top of the receptacle at that side of said strip and a hollow transparent cover removably mounted upon the top of the receptacle and adapted to close the opening of said top at the opposite side of said strip.

3. A receptacle of the character described having an open top and having its upper edge provided with a shoulder $d^2$, a narrow, metal transverse strip G extending across said receptacle and having its ends arranged to interlock therewith, leaving the receptacle open at each side of said strip, a lid H hinged to one side of said metal strip and a freely detachable cover removably mounted at the opposite side of said strip, said cover resting upon said shoulder $d^2$ and upon said strip.

LOUIS A. BECKER.

Witnesses:
GEO. P. FISHER, Jr.,
KATHARINE GERLACH.